US011051492B2

(12) United States Patent
Zhang

(10) Patent No.: US 11,051,492 B2
(45) Date of Patent: Jul. 6, 2021

(54) BUCKLE STRUCTURE

(71) Applicant: Zhongshan Great Pets International Co., Ltd., Guangdong (CN)

(72) Inventor: Zhengze Zhang, Guangdong (CN)

(73) Assignee: Zhongshan Great Pets International Co., Ltd., Zhongshan (CN)

( * ) Notice: Subject to any disclaimer, the term of this patent is extended or adjusted under 35 U.S.C. 154(b) by 0 days.

(21) Appl. No.: 16/705,295

(22) Filed: Dec. 6, 2019

(65) Prior Publication Data
US 2021/0120784 A1    Apr. 29, 2021

(30) Foreign Application Priority Data

Oct. 29, 2019   (CN) .......................... 201911034463.9

(51) Int. Cl.
*F16B 45/02* (2006.01)
*A01K 27/00* (2006.01)

(52) U.S. Cl.
CPC ............ *A01K 27/005* (2013.01); *F16B 45/02* (2013.01)

(58) Field of Classification Search
CPC ..... F16B 45/02; A44B 99/005; A01K 27/005; Y10T 24/45319; Y10T 24/45335; Y10T 24/45346; Y10T 24/45351; Y10T 24/45356
See application file for complete search history.

(56) References Cited

U.S. PATENT DOCUMENTS

| 184,002 | A | * | 11/1876 | Aldrich | G06Q 20/10 54/62 |
|---|---|---|---|---|---|
| 306,198 | A | * | 10/1884 | Wheeler | F16B 45/02 24/599.6 |
| 403,038 | A | * | 5/1889 | Codde | F16B 45/02 24/599.7 |
| 2,978,766 | A | * | 4/1961 | Arnett | F16G 17/00 294/82.19 |
| 3,831,229 | A | * | 8/1974 | Craven | B64D 17/32 294/82.25 |
| 5,664,304 | A | * | 9/1997 | Tambornino | F16B 45/02 24/370 |
| 8,434,429 | B2 | * | 5/2013 | Moeller | F16B 45/02 119/795 |
| 10,233,964 | B2 | * | 3/2019 | Schmitz | F16B 45/02 |

* cited by examiner

*Primary Examiner* — Robert Sandy

(57) ABSTRACT

A buckle structure includes a hook-shaped buckle body and a movable bolt. The hook-shaped buckle body includes a question mark-shaped body and a blocking section provided at an upper end thereof, a receiving cavity is formed between the movable bolt and the question mark-shaped body. The lower end of the movable bolt is hinged at the lower end of the question mark-shaped body, the upper end of the movable bolt is elastically contacted with the upper end of the question mark-shaped body. the contact point of the movable bolt and the hook-shaped buckle body is located in the middle of the hook-shaped buckle body, so that the buckle can be easily mounted on the buckle structure as long as the buckle is sleeved on the blocking section and the buckle is moved in the direction of the receiving cavity.

10 Claims, 7 Drawing Sheets

BUCKLE STRUCTURE

CROSS REFERENCE TO RELATED APPLICATIONS

The present application claims the benefit of Chinese Patent Application No. 201911034463.9 filed on Oct. 29, 2019, the contents of which are incorporated herein by reference in their entirety.

TECHNICAL FIELD

The present disclosure relates to the field of buckle technology, and in particular to a buckle structure, and more particularly to a buckle structure for connecting a buckle on a pet collar.

BACKGROUND

In today's society, it is very common for families to keep pets. Among them, cats and dog pets are mostly popular. When people go out to walk the pets, in order to prevent pets from being lost or injuring people accidentally, the leash that restricts pet action becomes an indispensable tool. The leash is generally connected to the buckle on the pet collar by means of a buckle to achieve a restriction on the movement of the pet. At present, the contact points of the existing buckle for the leash, the movable bolt and the hook-shaped buckle body of the pet are too close to the opening of the hook-shaped buckle body, so that the buckle on the collar is not easy to be installed into the buckle. For the person with poor vision, or when the line of sight is not good in the morning or evening, or when the dog is actively jumping, the buckle on the collar is even more difficult to install the buckle, which is very inconvenient to use, especially for the elderly. Moreover, since the contact point of the movable bolt and the hook-shaped buckle body is too close to the opening of the hook-shaped buckle body, at some angles, the buckle can be separated from the hook-shaped buckle body and surround the movable bolt, as shown in FIG. 1 and FIG. 2. When the pet applies force, the buckle on the collar has thrust on the movable bolt, which may directly slide out of the buckle, or the buckle can push the switch of the movable bolt and slide out of the buckle, so there is a risk and probability of slipping out, and potential dangers exist.

BRIEF SUMMARY OF THE INVENTION

In order to overcome the above deficiencies of the prior art, the present disclosure may provide a buckle structure that is convenient to use and safe.

The technical solution adopted by the present disclosure to solve the technical problems thereof is as follows:

A buckle structure may include a hook-shaped buckle body and a movable bolt, the hook-shaped buckle body may include a question mark-shaped body and a blocking section provided at an upper end of the question mark-shaped body, wherein an opening is formed between a lower end of the blocking section and the question mark-shaped body, a lower end of the movable bolt may be hinged at a lower end of the question mark-shaped body, and a reset device is provided between the movable bolt and the question mark-shaped body, and an upper end of the movable bolt is elastically contacted with the upper end of the question mark-shaped body, and a receiving cavity is formed between the movable bolt and the question mark-shaped body, the blocking section may be located outside the receiving cavity.

As an improvement of the above technical solution, the upper end of the blocking section and the upper end of the question mark-shaped body are smoothly transitionally connected, and a middle part of the blocking section is curved toward closely to the direction of the question mark-shaped body.

As an improvement of the above technical solution, the lower end of the blocking section is curved away from the direction of the question mark-shaped body.

As an improvement of the above technical solution, the upper end of the movable bolt is curved toward the upper end of the question mark-shaped body.

As an improvement of the above technical solution, the movable bolt may include a bolt body and a limiting block provided at an upper end of the bolt body, a lower end of the bolt body is hinged with the question mark-shaped body, and the upper end of the bolt body is elastically connected with the question mark-shaped body. The limiting block may be connected to a side of the bolt body adjacent to the question mark-shaped body, and the question mark-shaped body correspondingly defines a limiting slot which can accommodate the limiting block.

As an improvement of the above technical solution, the side of the upper end of the bolt body is provided with a handle.

As an improvement of the above technical solution, a part of the handle protrudes from a space surrounded by the question mark-shaped body and the blocking section.

As an improvement of the above technical solution, the lower end of the bolt body is provided with a connecting block, and the connecting block is provided with a first pin hole, and the lower end of the question mark-shaped body is correspondingly provided with a second pin hole, the movable bolt and the question mark-shaped body are coupled by a pin shaft passing through the first pin hole and the second pin hole, and the movable bolt is rotatable relative to the pin shaft.

As an improvement of the above technical solution, the reset device is a torsion spring sleeved on the pin shaft, one end of the torsion spring abuts the movable bolt, and the other end of the torsion spring abuts the question mark-shaped body.

As an improvement of the above technical solution, the lower end of the question mark-shaped body is provided with a storage slot, and the reset device is placed in the storage slot.

The beneficial effects of the disclosure are that:

the hook-shaped buckle body of the buckle structure may include a question mark-shaped body and a blocking section. The upper end of the movable bolt is elastically contacted with the upper end of the question mark-shaped body, that is, the contact point of the movable bolt and the hook-shaped buckle body is located at the middle of the hook-shaped buckle body. The blocking section is located outside the receiving cavity formed by the movable bolt and the question mark-shaped body, so that when the buckle is installed into the buckle structure, as long as the buckle is sleeved on the blocking section and the buckle is moved toward the receiving cavity, the buckle can be easily installed on the buckle structure, that is, the blocking section can assist the buckle to be introduced into the receiving cavity, which greatly facilitates the introduction and installation of the buckle to the buckle structure. Moreover, the blocking section is located outside the receiving cavity, which can block the buckle from sliding off the hook-shaped buckle body. The buckle can not surround the movable bolt, so that no matter how much force is applied to the buckle, the buckle can not push the movable bolt, so that the buckle will not slide out of the buckle structure, which eliminates the risk and probability of the buckle slipping out and is safe to use.

BRIEF DESCRIPTION OF THE DRAWINGS

The present disclosure will be further described below in conjunction with the accompanying drawings and specific embodiments, wherein.

DETAILED DESCRIPTION OF EMBODIMENTS

Figure 1:
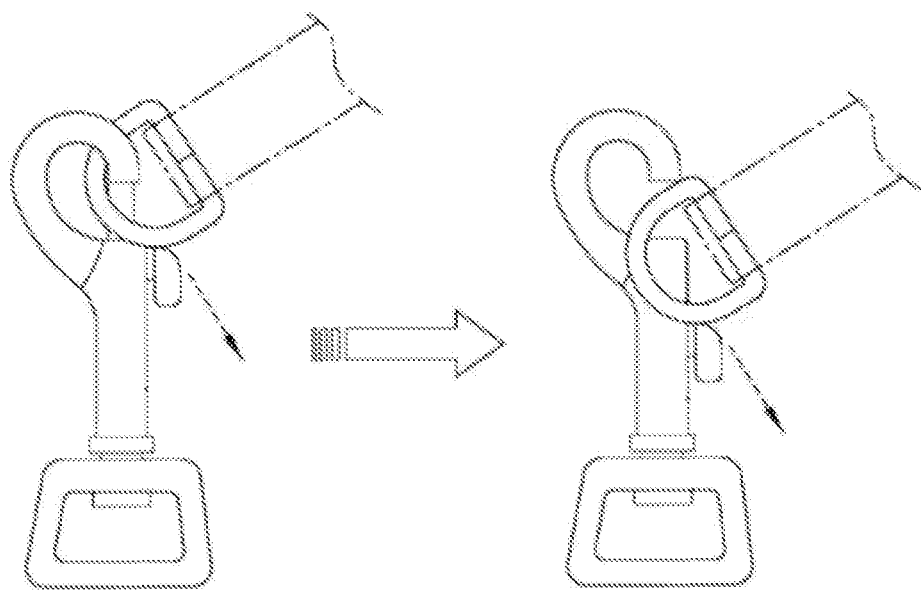
FIG. 1 is a schematic view showing one of the structures of the prior art in which the buckle slides out of the buckle.
Figure 2:
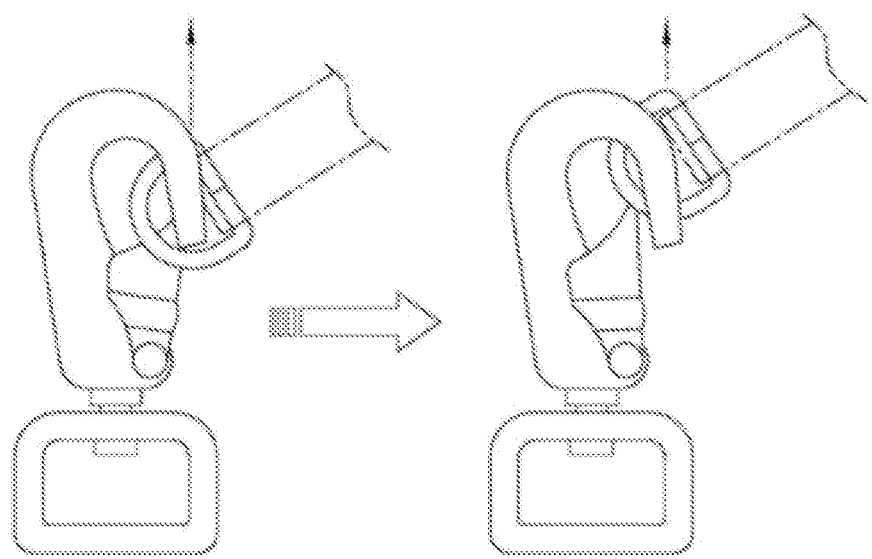
FIG. 2 is schematic view showing the other one of the structures of the prior art in which the buckle slides out of the buckle.
Figure 3:
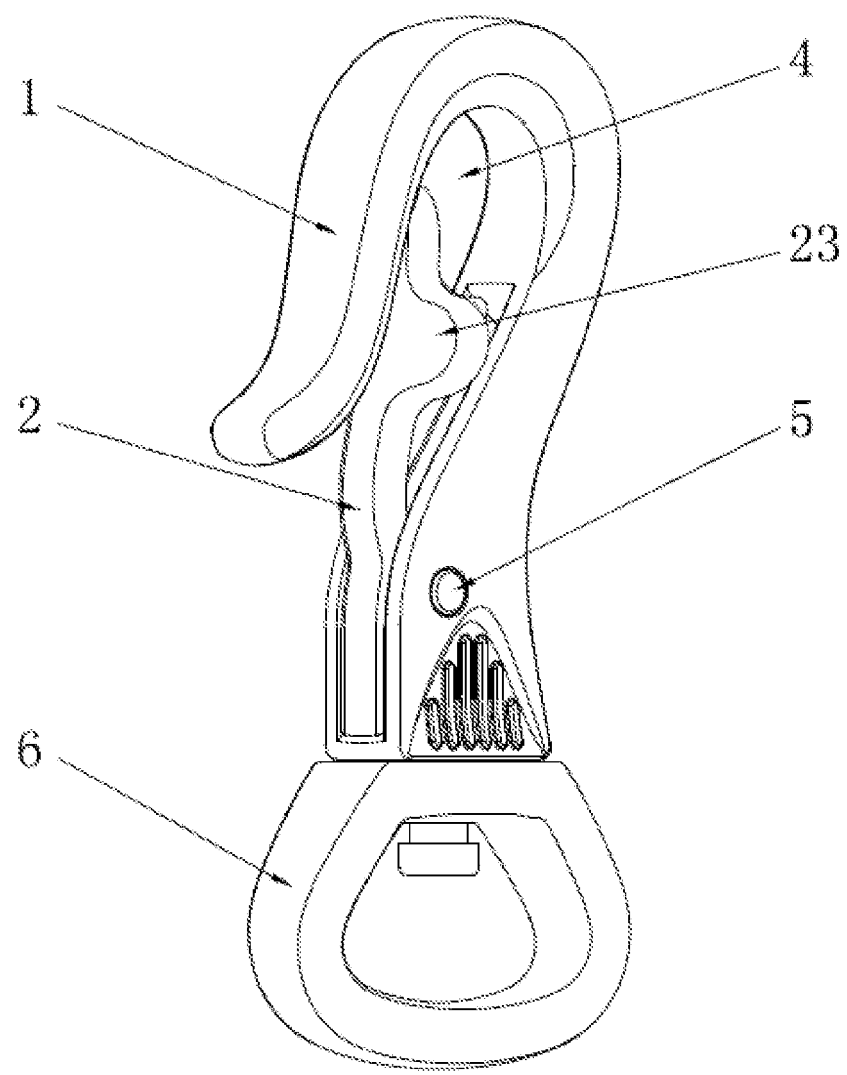
FIG. 3 is a schematic perspective view according to an embodiment of the present disclosure.
Figure 4:
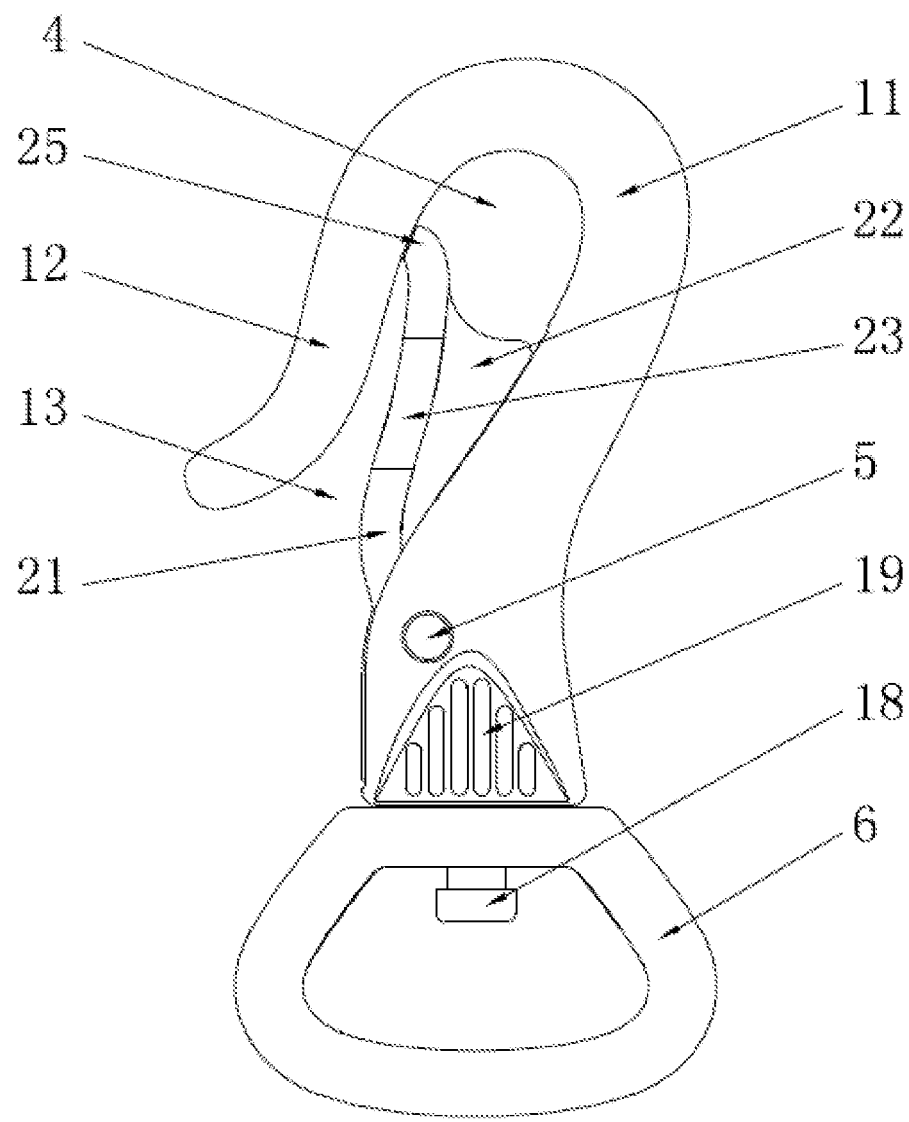
FIG. 4 is a side view according to an embodiment of the present disclosure.

Referring to FIG. 3 and FIG. 4, a buckle structure of the present disclosure may include a hook-shaped buckle body 1 and a movable bolt 2. The hook-shaped buckle body 1 may include a question mark-shaped body 11 and a blocking section 12 provided at an upper end of the question mark-shaped body 11. An opening 13 can be formed between the lower end of the blocking section 12 and the question mark-shaped body 11. The lower end of the movable bolt 2 may be hinged at the lower end of the question mark-shaped body 11, and a reset device 3 is provided between the movable bolt 2 and the question mark-shaped body 11. The upper end of the movable bolt 2 may be elastically contacted with the upper end of the question mark-shaped body 11, and the receiving cavity 4 can be formed between the movable bolt 2 and the question mark-shaped body 11, and the blocking section 12 may be located outside the receiving cavity 4.

Figure 5:
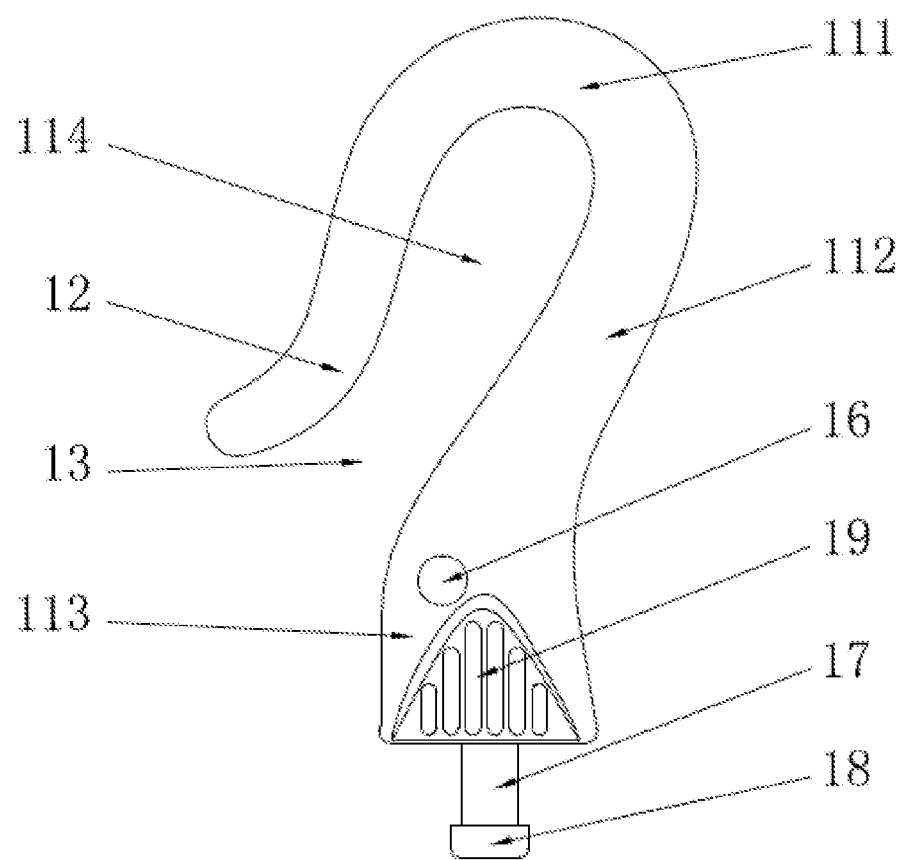
FIG. 5 is a schematic structural view of the hook-shaped buckle body according to an embodiment of the present disclosure.

Referring specifically to FIG. 5, the question mark-shaped body 11 and the blocking section 12 may be of integrated structure, and the question mark-shaped body 11 may include a curved section 111 at its upper end, an inclined section 112 at its middle part, and a vertical section 113 at its lower end. Inclined elongated spaces 114 may be formed between the blocking section 12 and the curved section 111, or formed between the blocking section 12 and the inclined sections 112. The vertical length of the elongated space is larger than the lateral width thereof, and the opening 13 and the receiving cavity 4 may be both part of the elongated space 114.

Moreover, the upper end of the blocking section 12 and the upper end of the question mark-shaped body 11 may be smoothly transitionally connected, and the middle part of the blocking section 12 may be curved toward the direction of the question mark-shaped body 11, and the lower end of the blocking section 12 may be curved away from the direction of the question mark-shaped body 11. In the present embodiment, the upper end of the blocking section 12 and the curved section 111 may be smoothly transitionally connected, the middle of the blocking section 12 is curved toward the direction of the inclined section 112, and the lower end of the blocking section 12 is curved away from the blocking section 112. Surely, there may be other cases where, for example, the middle portion of the blocking section 12 is curved toward the direction of the vertical section 113, and the lower end of the blocking section 12 is curved away from the vertical section 113.

Thus, the buckle is introduced into the receiving cavity 4 in the direction, the opening 13 is large at the proximal end and small at the distal end, so that the buckle is facilitated to insert into the opening at the proximal end, and then it can reduce the probability of the buckle sliding out of the opening 13 from the receiving cavity 4 at the distal end. Moreover, the lower end of the blocking portion 12 may be curved away from the question mark-shaped body 11, and the buckle can be better prevented from sliding off the hook-shaped buckle body 1.

Referring to FIG. 4 for further details, the upper end of the movable bolt 2 may be curved toward the upper end of the question mark-shaped body 11 to form a barrier section 25, and one end of the barrier section 25 may be elastically contacted with the curved section 111, and the barrier section 25 and the curved section 111 are mutually perpendicular to each other at the contact point. The movable bolt 2 may include a bolt body 21 and a limiting block 22 provided at an upper end of the bolt body 21. The lower end of the bolt body 21 may be hinged with the question mark-shaped body 11, and the upper end of the bolt body 21 is the barrier section 25 designed such that when the buckle is applied with force toward the movable bolt 2 from the contact position of the movable bolt 2 and the hook-shaped buckle body 1 in the receiving cavity 4, the direction of the thrust is always directed toward the near direction pushing the movable bolt 2 toward the hook-shaped buckle body 1. That is, the direction of the thrust is directed toward the locking direction of the movable bolt 2, the buckle can not extrude the movable bolt 2, which can effectively prevent the buckle from disengaging the buckle structure.

Figure 6:
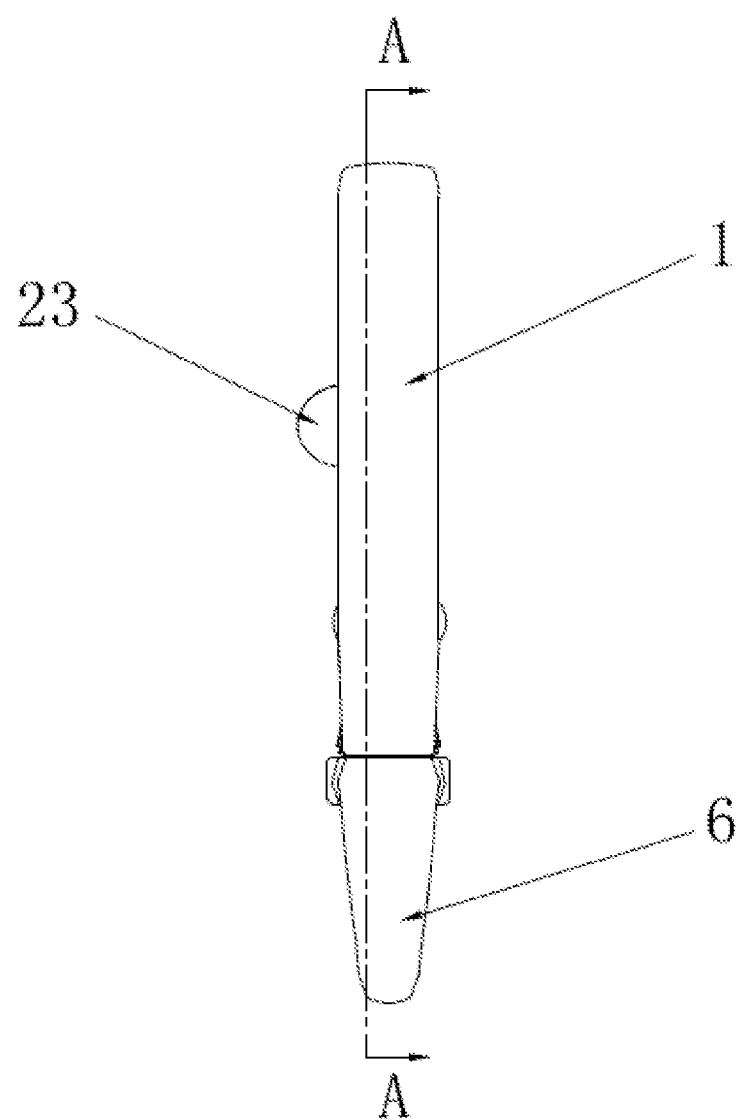
FIG. 6 is a rear side view according to an embodiment of the present disclosure.
Figure 7:
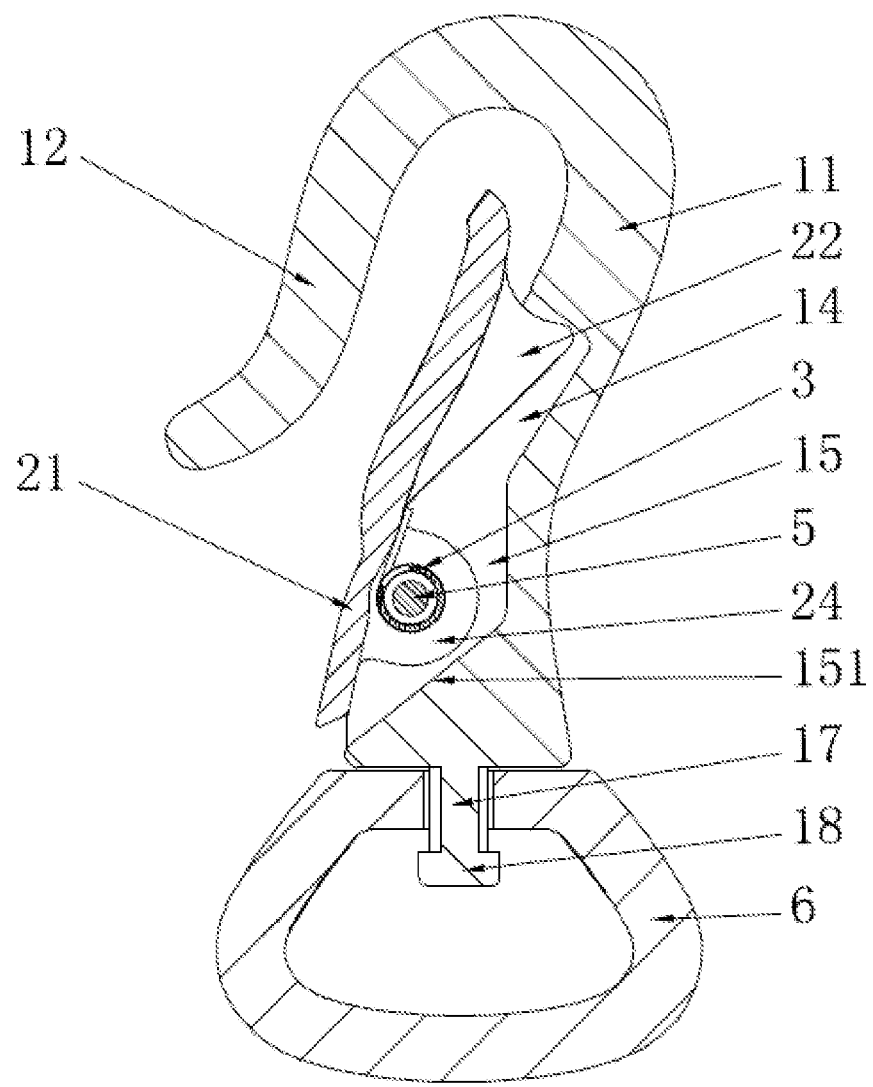
FIG. 7 is a cross-sectional structural view of the A-A section of FIG. 6.

Referring to FIG. 6 and FIG. 7, the limiting block 22 may be connected to the side of the bolt body 21 adjacent to the question mark-shaped body 11. Specifically, the limiting block 22 is connected to the bolt body 21 at the side adjacent to the inclined section 112. A limiting slot 14 is defined in the inclined section 112, and the limiting slot 14 can accommodate the limiting block 22. In this embodiment, the limiting block 22 may be an inverted triangle, and the upper end surface of the inverted triangle is smoothly connected with the bolt body 21, the limiting slot 14 may be a cubic shape, and the notch of the limiting slot 14 may face the elongated space 114.

Further, a handle 23 may be provided on the side of the upper end of the bolt body 21. A part of the handle 23 may protrude from the space surrounded by the question mark-shaped body 11 and the blocking section 12. Both the handle 23 and the portion of the bolt body 21 provided with the handle 23 are curved in a direction close to the inclined section 112, making the finger more comfortable when the handle 23 is pressed.

Further, the lower end of the bolt body 21 may be provided with a connecting block 24 which is provided with a first pin hole. The connecting block 24 is formed as part in a circular shape, and the first pin hole is provided at the center of the circle. The lower end of the question mark-shaped body 11 is correspondingly provided with a second pin hole 16, and the movable bolt 2 and the question mark-shaped body 11 are connected by the pin shaft 5 passing through the first pin hole and the second pin hole 16, and the movable bolt 2 can be rotated relative to the pin shaft 5.

Specifically, the vertical section 113 may be provided with a storage slot 15, the notch of the storage slot 15 may face the elongated space 114, the storage slot 15 communicates with the limiting slot 14. The connecting block 24 and the lower part of the bolt body 21 are located in the storage slot 15, the pin 5 may pass through the storage slot 15. The reset device 3 may be a torsion spring, and the torsion spring may be located in the storage slot 15. The torsion spring may be sleeved on the pin shaft 5, and one end of the torsion spring abuts the movable bolt 2, and the other end of the torsion spring abuts the vertical section 113. The restoring force of the torsion spring may cause the upper end of the movable bolt 2 to rotate in the direction of the blocking section 12 to seal the receiving cavity 4, and the lower portion of the bolt body 21 may block the notch of the storage slot 15. The lower side surface of the storage tank 15 may be an inclined surface 151 forming an obtuse angle with the bottom of the storage slot 15. The liquid or small debris falling from the limiting slot 14 into the storage slot 15 can press the handle 23 toward the inclined section 112, and they may fall from the lower end of the inclined surface 151. The lower side of the bolt body 21 may be also inclined.

Further, the outer side of the lower end of the question mark-shaped body 11, that is, the outer side of the vertical section 113 may be provided with a non-slip pattern 19, and the non-slip pattern 19 may be a plurality of vertical projections. The lower end of the hook-shaped buckle body 1 may be movably connected with an annular body 6. Specifically, the lower end surface of the hook-shaped buckle body 1 is provided with a cylindrical body 17, and the lower end surface of the cylindrical body is provided with a limiting column 18. The annular body 6 may be provided with a cylindrical hole, and the cylindrical body 17 is bored in the cylindrical hole. The diameter of the cylindrical hole is smaller than that of the limiting column 18.

The above is only a preferred embodiment of the present disclosure, but the present disclosure is not limited to the above embodiments, and as long as it achieves the technical effects of the present disclosure by any identical or similar means, it should fall within the protection scope of the present disclosure.

What is claimed is:

1. A buckle structure comprising a hook-shaped buckle body (1) and a movable bolt (2), wherein: the hook-shaped buckle body (1) comprises a question mark-shaped body (11) and a blocking section (12) provided at an upper end of the question mark-shaped body (11); an opening (13) is formed between a lower end of the blocking section (12) and the question mark-shaped body (11); and a lower end of the movable bolt (2) is hinged to a lower end of the question mark-shaped body (11), a reset device (3) is provided between the movable bolt (2) and the question mark-shaped body (11), and an upper end of the movable bolt (2) is elastically contacted with the upper end of the question mark-shaped body (11); a receiving cavity (4) is formed between the movable bolt (2) and the question mark-shaped body (11), and the blocking section (12) is located outside the receiving cavity (4);

wherein the upper end of the movable bolt (2) is curved toward the upper end of the question mark-shaped body (11);

wherein the movable bolt (2) comprises a bolt body (21) and a limiting block (22) provided at an upper end of the bolt body (21), a lower end of the bolt body (21) is hinged with the question mark-shaped body (11), the upper end of the bolt body (21) is elastically contacted with the question mark-shaped body (11), and the limiting block (22) is connected to the bolt body (21) at a side adjacent to the question mark-shaped body (11), the question mark-shaped body (11) correspondingly defines a limiting slot (14) which can accommodate the limiting block (22).

2. The buckle structure as claimed in claim 1, wherein: the upper end of the blocking section (12) is smoothly transitionally connected with the upper end of the question mark-shaped body (11), and a middle part of the blocking section (12) is curved toward closely to a direction of the question mark-shaped body (11).

3. The buckle structure as claimed in claim 2, wherein the lower end of the blocking section (12) is curved away from the question mark-shaped body (11).

4. The buckle structure as claimed in claim 1, wherein a side of the upper end of the bolt body (21) is provided with a handle (23).

5. The buckle structure as claimed in claim 4, wherein a part of the handle (23) protrudes from a space surrounded by the question mark-shaped body (11) and the blocking section (12).

6. The buckle structure as claimed in claim 1, wherein the lower end of the bolt body (21) is provided with a connecting block (24), and the connecting block (24) is provided with a first pin hole; the lower end of the question mark-shaped body (11) is correspondingly provided with a second pin hole (16), and the movable bolt (2) and the question mark-shaped body (11) are connected in a manner that a pin shaft (5) passing through the first pin hole and the second pin hole (16); the movable bolt (2) is rotatable relative to the pin shaft (5).

7. The buckle structure as claimed in claim 6, wherein the reset device (3) is a torsion spring sleeved on the pin shaft (5), and one end of the torsion spring abuts the movable bolt (2), an other end of the torsion spring abuts the question mark-shaped body (11).

8. The buckle structure as claimed in claim 7, wherein the lower end of the question mark-shaped body (11) is provided with a storage slot (15), and the reset device (3) is placed in the storage slot (15).

9. The buckle structure as claimed in claim 6, wherein the lower end of the question mark-shaped body (11) is provided with a storage slot (15), and the reset device (3) is placed in the storage slot (15).

10. The buckle structure as claimed in claim 1, wherein the question mark-shaped body (11) and the blocking section (12) are of integrated structure; the question mark-shaped body (11) comprises a curved section (111) at the upper end, an inclined section (112) at a middle part, and a vertical section (113) at the lower end.

* * * * *